United States Patent [19]

Van Der Schrieck

[11] Patent Number: 5,584,993

[45] Date of Patent: Dec. 17, 1996

[54] SETTLING UNIT WITH PLATE SEPARATOR

[75] Inventor: Gérard L. M. Van Der Schrieck, Delft, Netherlands

[73] Assignee: Hollandsche Beton Groep N.V., Rijswijk, Netherlands

[21] Appl. No.: 305,653

[22] Filed: Sep. 14, 1994

[30] Foreign Application Priority Data

Sep. 14, 1993 [NL] Netherlands .................... 9301589

[51] Int. Cl.⁶ .................................................. B01D 21/24
[52] U.S. Cl. ...................... 210/170; 210/242.1; 210/521; 210/533; 210/534
[58] Field of Search ................... 210/521, 532.1, 210/533, 534, 540, 242.1, 170

[56] References Cited

U.S. PATENT DOCUMENTS

| | | | |
|---|---|---|---|
| 2,573,615 | 10/1951 | Seailles | 210/521 |
| 2,673,451 | 3/1954 | Gariel | 210/521 |
| 3,275,157 | 9/1966 | Stamps | 210/521 |
| 3,640,387 | 2/1972 | Conley et al. | 210/521 |
| 3,807,563 | 4/1974 | Reid, Jr. | 210/205 |
| 4,514,303 | 4/1985 | Moore | 210/521 |
| 4,710,295 | 12/1987 | Zabel | 210/521 |
| 4,780,206 | 10/1988 | Beard et al. | 210/521 |
| 5,228,983 | 7/1993 | Nims | 210/521 |

FOREIGN PATENT DOCUMENTS

| | | |
|---|---|---|
| 1028282 | 5/1953 | France . |
| 2099372 | 3/1972 | France . |
| 89701 | 12/1896 | Germany . |
| 2551623 | 6/1977 | Germany . |

*Primary Examiner*—Christopher Upton
*Attorney, Agent, or Firm*—Young & Thompson

[57] ABSTRACT

A settling unit for separating a liquid and the particles. Such as sand, suspended therein, comprises a basin with an inlet for the liquid mixture containing the particles, and an overflow for discharging the liquid after at least some of the particles have been removed therefrom through settling. With a view to increasing the efficiency, a plate separator is provided at the position of the overflow, which plate separator has a liquid outlet which is connected to the overflow and an outlet for settled particles which is connected to the basin. The gaps defined between the plates can be shut off at their underside by a non-return valve which can be moved into an open position under the influence of the weight of the separated particles.

11 Claims, 2 Drawing Sheets

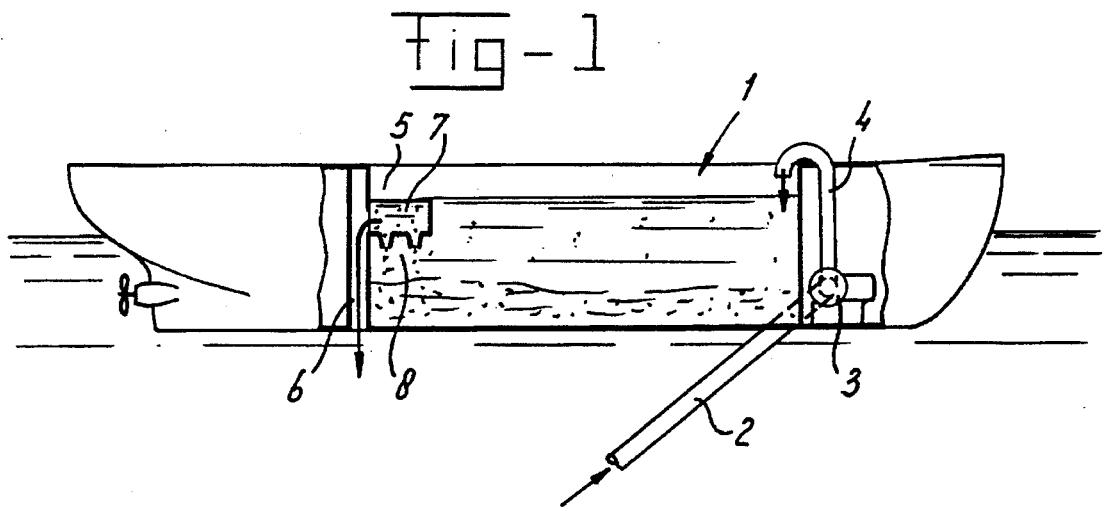
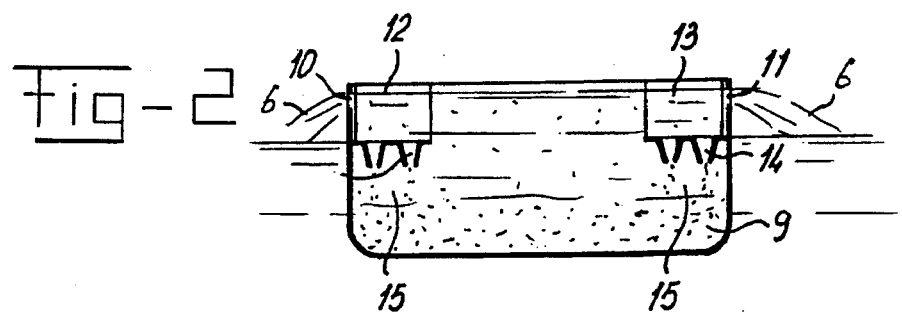
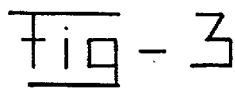
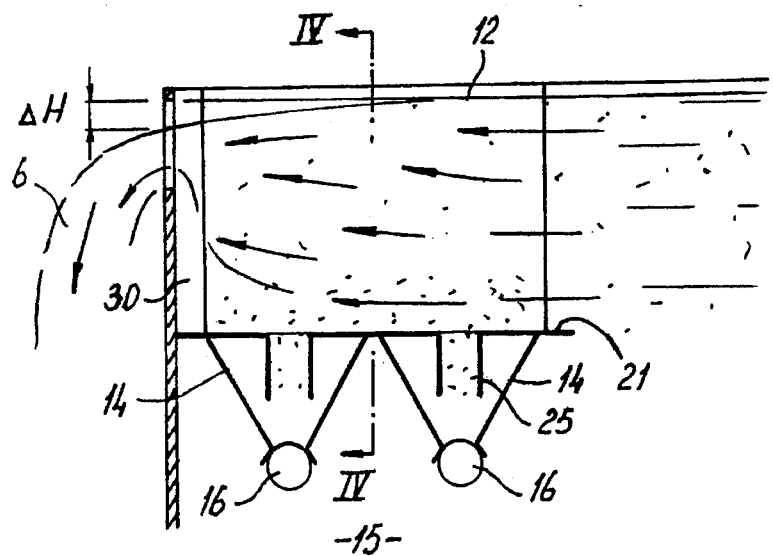

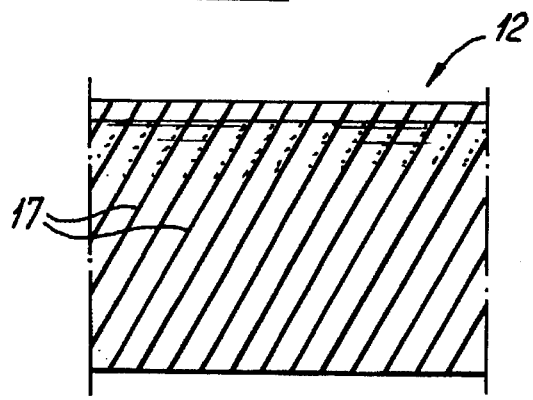
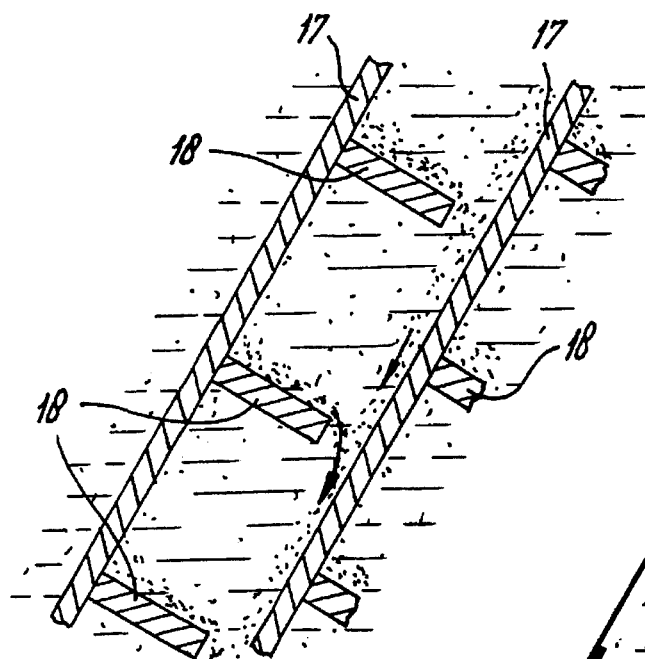
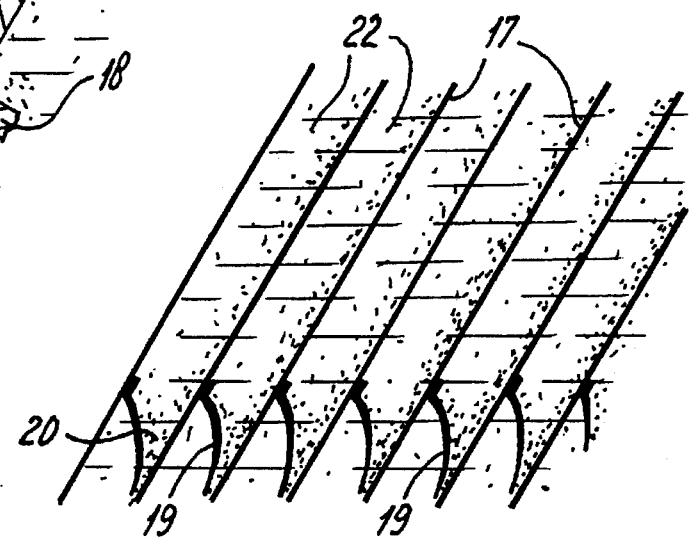

SETTLING UNIT WITH PLATE SEPARATOR

The invention relates to a settling unit for separating a liquid, such as water, from the particles, such as sand, suspended therein, comprising a basin with an inlet for the liquid mixture containing the particles, and an overflow for discharging the liquid after at least some of the particles have been removed therefrom through settling.

Such units are generally known. They are found in, for example, water-treatment plants; and such units are also found in the hopper in testing installations of dredgers such as hopper dredgers.

The purpose of such units is to remove the largest possible quantity of the solid particles. However, it is found in practice that a certain quantity of particles unavoidably still leaves the unit with the liquid through the overflow.

The overflow losses during dredging of sand with a hopper dredger, for example, are a known phenomenon. These overflow losses increase as the settling rate of the particles decreases, due to the fact that, for example, the average granule diameter of the particles becomes smaller or the viscosity of the liquid increases, or due to high turbulence. Such phenomena are undesirable.

The object of the invention is therefore to provide a device of the abovementioned type which does not have these disadvantages. This object is achieved through the fact that a plate separator is provided at the position of the overflow, which plate separator has a liquid outlet which is connected to the overflow and an outlet for settled particles which is connected to the basin.

The particles which have not had the chance to settle in the basin can still be separated in the plate separator and fed to the basin. The result is that the efficiency of the whole unit increases. In the region of the basin below the plate separator, which is screened off from the overflow by the latter, relatively weak flows prevail, so that the material fed by the plate separator to the basin can settle without being disturbed.

The plate separator is situated upstream of the overflow, viewed in the direction of flow, the plates of the separator running essentially parallel to the direction of flow. The particles in this case can settle at right angles to the direction of flow (cross-flow).

The plates of the separator are disposed parallel to each other at an angle, and can also be provided at their downward-facing side with downward-directed ribs extending to some distance from the adjacent plate.

An important condition for good functioning of the plate separator is that the particles can settle therein without being disturbed by flows in the opposite direction to the direction of settling. For that reason, the gaps defined between the plates are shut off at their underside by a non-return valve which can be moved into an open position under the influence of the weight of the separated particles. The non-return valve prevents upward-directed flows from occurring in the gaps and possibly disrupting the settling process.

According to a first possible embodiment, a number of gaps in each case opens out at the underside into a funnel, which funnel bears a non-return valve at its narrowed end. Despite the essentially horizontal flow of the liquid in the gaps towards the overflow, short-circuit flows, albeit small, can still occur. Such short-circuit flows are partially directed upwards, and can therefore impede the settling process.

According to a second possible embodiment, each gap is therefore provided with its own non-return valve at its underside. The advantage of this embodiment is that the abovementioned short-circuit flows can no longer occur at the underside of the abovementioned gaps.

Many different designs can be used for the non-return valve, but a non-return valve with one or more rubber flaps which are held shut under pre-tension, for example produced by spring force, their own weight or liquid pressure differences, is preferred. The abovementioned rubber or flexible flaps may if desired be made heavier and/or reinforced by metal strip-like parts which are fixed to the flaps. As soon as more and more particles collect on the non-return valve, the latter opens and the particles pass into the basin. As a result of the pre-tension, the valve then shuts again, with the result that the next quantity of settled particles can be collected.

This process can also be continuous, because the tightly packed settled particles, which are present on top of and possibly in the valve as a thick substance, through the height and density of said substance continuously control the valve opening, and thereby also control the rate of fall of the substance. The thick substance builds up continuously from the top as settled particles are added to it and, after passing through the valve, crumbles into fragments which then settle in the hopper. Owing to the height of the substance, a seal against short-circuit flows is formed; in this case they are mainly upward-directed flows through the valve.

According to an advantageous embodiment, each non-return valve comprises two rubber flaps which are held against each other under pretension. The two flaps can form part of a flattened rubber hose.

According to a preferred embodiment, each non-return valve comprises a single flexible flap which is fixed by its top side to a plate in each case and rests with its bottom side under pre-tension against an adjacent plate.

The settling behaviour of the particles depends largely on their granule size and the viscosity of the liquid. This can be taken into account in a design in which the slant of the plates is adjustable.

The invention can be used in particular in the case of a hopper dredger or hopper vessel having as the hopper a unit with an overflow. In this case an overflow with plate separator can be provided on either side of the hopper. It is possible for the overflow with separator to be located in the end partition of the hopper or in the side walls, or for the separator to be fixed to an overflow shaft which is freestanding in the hopper.

The invention will be explained in greater detail below with reference to a number of exemplary embodiments shown in the figures.

FIG. 1 shows a side view of a hopper dredger provided with the unit according to the invention, with an overflow in the end partition.

FIG. 2 shows a cross-section through the hopper of a second embodiment of a hopper dredger or hopper vessel with an overflow in the side wall of the hopper.

FIG. 3 shows a detail of FIG. 2 on a larger scale.

FIG. 4 shows the section along line IV—IV of FIG. 3.

FIG. 5 shows a detail of FIG. 4 on a larger scale.

FIG. 6 shows a number of plates, each with their own non-return valve.

The hopper dredger shown in FIG. 1 has a unit according to the invention, indicated in its entirety by 1.

Said unit in this case forms the hopper of the hopper dredger.

The dredge spoil brought up is fed through supply line 4 to the hopper 1 by means of the only partially shown suction line 2, which is hingedly connected to the hopper dredger at 3. The dredge spoil brought up initially collects on the bottom of the hopper 1, where the sand can settle. However, the water level in the hopper rises continuously, until it reaches the overflow 5. The water can then escape through overflow 5 and outlet pipe 6.

According to the invention, a plate separator 7 is now fitted upstream of the overflow 5, viewed in the direction of flow. The particles which have not yet settled, and which are in danger of escaping with the water through the overflow in the side wall of the hopper, can still be separated by means of said plate separator. The water remaining ultimately flows away through overflow 5, while the now separated particles pass from the plate separator into the region 8 below the plate separator. This region 8 is screened off relative to the water which is flowing away, with the result that little flow prevails there. This means that the particles separated in the plate separator 7 can settle without being disturbed.

The cross-section of FIG. 2 again shows a hopper 9, having an overflow 10, 11 at each of the longitudinal sides. Plate separators 12, 13 are placed upstream of each of these overflows 10, 11, viewed in the direction of flow. These plate separators are provided at the underside with funnels 14, through which the separated particles pass into the relatively calm regions 15 below the plate separators 12, 13.

In the enlarged view of FIG. 3 it can be seen that the separator 12 is accommodated on a supporting plate 21, which has openings at the position of the gaps between the plates. The separated particles can consequently collect in the funnels 14, which are held in the closed position by means of non-return valves 16. Partitions 25 with possible tube-like structures can be disposed in the funnels 14, in order to prevent as far as possible short-circuit flows, depending on the circumstances, from passing through the funnels.

A collection chamber 30 can be situated between separator 12 and the overflow. If the collection chamber is increased in size or the distance between separator 12 and the overflow is increased, it is ensured that the flows in the separator run horizontally as long as possible.

As soon as sufficient material has collected in the funnels 14, the non-return valves 16 are opened, so that the particles can settle in the relatively calm region 15 below the plate separators.

The non-return valves can be designed with rubber flaps pressed against each other under pre-tension, which flaps can be pushed apart through the force exerted thereon by the weight of the collected particles. Said pre-tension can be produced by spring-loaded structures, the weight of the valves or flaps themselves and/or the difference in liquid pressure delta-H (see, for example, FIG. 3) between inside and outside of the flap.

The difference in liquid pressure can vary between zero and delta-H, depending on the flow patterns and the density of the suspension.

The sectional view in FIG. 4 shows the slanting position of the plates 17 of the plate separator.

FIG. 5 shows a preferred embodiment with increased settling surface area, in such a way that each plate 17 is provided on the underside with ribs 18 placed so that slant downwards. The particles can also collect on these ribs 18, and then slide off the ribs 18 and flow downwards over the surface of the plate lying opposite and into the funnels 14.

In the embodiment of FIG. 6 the plates each have at their underside a non-return valve in the form of a rubber flap 19. Each flexible flap is fixed by its top side to the corresponding plate 17, and rests with its underside under pre-tension against an adjacent plate 17. A quantity of settled particles 20 collects in the wedge-shaped space between flap 19 and opposite-lying plate 17. As soon as the weight of the quantity of settled particles exceeds the pre-tension with which the rubber flap 19 is held shut, the rubber flap 19 opens, and the particles can escape to the hopper.

Immediately afterwards, the rubber flap 19 closes again, so that upward-directed flows, which would impede the settling of further particles in the gap 20 between the plates 17, are avoided. If there is continuous settlement of particles, an equilibrium can become established with a downward-moving layer of settled particles between the flexible valve and plate 17.

Moreover, no short-circuit flows can occur between the various gaps, since each gap is shut off by its own rubber flap 19.

Such a system is very simple and is self-regulating, which has a beneficial effect on reliable operation of the plate separator.

I claim:

1. In a hopper dredger comprising a hopper with an inlet for a liquid mixture containing solid particles, and an overflow for discharging liquid after at least some of the particles have been removed therefrom by settling, a plate separator at the position of the overflow, which plate separator has a liquid inlet which is connected to the overflow, an outlet for settled particles which is connected to the hopper, and the liquid outlet overboard the dredger, in which gaps defined between the plates are shut off at their underside by a nonreturn valve which comprises means moving into an open position under the weight of the separated particles to discharge the separated particles by gravity into the hopper but to prevent backflow of liquid from the hopper into said gaps, said nonreturn valve comprising the sole opening between the plates by which solids are discharged into the hopper.

2. Hopper dredger according to claim 1, in which said liquid inlet lies opposite and at the same level as said liquid outlet, the outlet for settled particles being situated at a lower level than the liquid inlet and the liquid outlet.

3. Hopper dredger according to claim 1, in which plates of the separator are disposed parallel to each other at an angle, and are also provided at their downward-facing side with downwardly-directed ribs extending to a distance from the adjacent plate.

4. Hopper dredger according to claim 1, in which a horizontal separation wall is provided beneath the plates, which separation wall has at least one discharge.

5. Hopper dredger according to claim 4, in which beneath at least one of the separation walls and the gaps there is a funnel, which funnel bears a non-return valve at its underside.

6. Hopper dredger according to claim 1, in which each gap is provided with its own non-return valve at its underside.

7. Hopper dredger according to claim 6, in which each non-return valve comprises a single rubber flap which is fixed by its top side to a plate and rests with its bottom side under pretension against an adjacent plate.

8. Hopper dredger according to claim 1, in which the non-return valve comprises at least one flexible flap which is held shut under pretension, such that no flow occurs in an upward direction.

9. Hopper dredger according to claim 1, in which the slant of the plates of the plate separator is adjustable.

10. Hopper dredger according to claim 1, in which the plate separator is bounded by an end wall, the top edge of which end wall is at a lower level than the top edge of each plate of the plate separator, thus forming the overflow.

11. Hopper dredger according to claim 10, in which the end wall has at least one opening, the lower boundary of which opening forms the overflow.

* * * * *